(12) United States Patent
Zisa et al.

(10) Patent No.: US 8,514,280 B2
(45) Date of Patent: Aug. 20, 2013

(54) METHOD AND SYSTEM FOR DETECTING AN INDIVIDUAL BY MEANS OF PASSIVE INFRARED SENSORS

(75) Inventors: Joseph Zisa, Le Cannet (FR); Bernard Taillade, Vendargues (FR)

(73) Assignees: Joseph Zisa, Cannes (FR); Hymatom SA, Vendargues (FR)

( * ) Notice: Subject to any disclaimer, the term of this patent is extended or adjusted under 35 U.S.C. 154(b) by 1253 days.

(21) Appl. No.: 12/093,616

(22) PCT Filed: Nov. 22, 2006

(86) PCT No.: PCT/FR2006/002579
§ 371 (c)(1),
(2), (4) Date: Aug. 11, 2008

(87) PCT Pub. No.: WO2007/080241
PCT Pub. Date: Jul. 19, 2007

(65) Prior Publication Data
US 2009/0219388 A1    Sep. 3, 2009

(30) Foreign Application Priority Data
Dec. 19, 2005  (FR) ...................................... 05 12872

(51) Int. Cl.
*H04N 7/18*    (2006.01)
(52) U.S. Cl.
USPC ........................ 348/143; 382/181; 340/572.1

(58) Field of Classification Search
USPC ................. 340/426.26, 522, 572.1; 356/610; 396/51; 382/181, 224
See application file for complete search history.

(56) References Cited

U.S. PATENT DOCUMENTS

| | | | | |
|---|---|---|---|---|
| 5,355,222 A | * | 10/1994 | Heller et al. ................... | 356/610 |
| 5,692,222 A | * | 11/1997 | Yamada et al. ................. | 396/51 |
| 6,081,619 A | * | 6/2000 | Hashimoto et al. ........... | 382/181 |
| 6,166,625 A | * | 12/2000 | Teowee et al. ........... | 340/426.26 |
| 6,525,658 B2 | * | 2/2003 | Streetman et al. ............. | 340/522 |
| 2002/0131643 A1 | * | 9/2002 | Fels et al. ...................... | 382/224 |
| 2005/0280535 A1 | * | 12/2005 | Gary, Jr. ..................... | 340/572.1 |

* cited by examiner

*Primary Examiner* — Dustin Nguyen
(74) *Attorney, Agent, or Firm* — Jackson Patent Law Office

(57) ABSTRACT

The invention relates to a method and a system for detecting an individual in a given observation zone by means of N passive infrared sensors (1) each consisting of an optical device (2) provided with a matrix of cells focusing the infrared energy (IR) received onto a single pyro-electric component (3) linked to a calculation unit (4) able to interpret the information received. The device according to the invention is characterized in that it consists, in order to detect an individual in the observation zone, in employing a limited number of N similar infrared sensors (1) centered on the same observation zone, each provided with $2^N-1$ cells (2C), and hence beams (F), which for each of the latter are masked, according to a different combination in such a way as to provide the calculation unit with the information enabling the individual to be located in terms of position and displacement.

10 Claims, 3 Drawing Sheets

Figure 1:
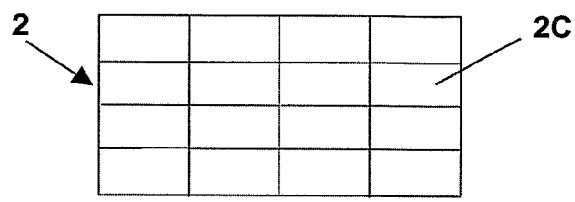

METHOD AND SYSTEM FOR DETECTING AN INDIVIDUAL BY MEANS OF PASSIVE INFRARED SENSORS

The current invention relates to a method and a system of passive infrared sensors for detecting, locating, and tracking an individual by movement analysis.

In the present state of the art, detection of an individual is effectuated in particular by picking up the individual's emission of infra-red rays using optical receivers. These receivers use a pyro-electric component, the field of vision of which being segmented into "observation beams", which are areas of space in which the sensor sees an infra-red source. This segmentation is most commonly performed by a matrix of Fresnel lenses and more rarely by a structure of mirrors and other more exotic solutions.

The passive infrared sensors of this type therefore usually have a matrix Fresnel lens that focuses all infra-red radiation from the observation beams onto a single pyro-electric component, without being able to differentiate them, in other words without being able to determine the position of the individual in the observation area, much less the individual's movement.

To do so would require as many pyro-electric components as optical beams, having as a direct consequence a significant investment cost, computing resources and consequent energy consumption.

Such a system is described in the patent EP0633554.

As for the localization and tracking of people, the solution that has been adopted in recent decades is the analysis of video images. Although interesting results have been achieved, the requirements of energy, brightness, computing power and data rate, and therefore the cost, are such that video analysis is not usable in many applications.

The present invention relates to a method and a system of detection and analysis of movement of an individual in a given observation zone by means of several passive infrared sensors each adapted to receive infrared energy emitted by an individual traversing the aforementioned zone; each infrared sensor being constituted by an optical device focusing the received infrared energy onto a single pyro-electric component; each optical device constituted by a matrix of cells, of the lens, mirror, or other type, arranged in order to pick up a plurality of beams according to a well defined horizontal and vertical distribution; each pyro-electric component being coupled to a computing unit able to interpret the received data.

In that which follows we use "cells" as a generic term for any optical system segmenting the field of vision of the pyro-electric component and focusing the infra-red radiation on the latter.

The invention is directed to implementing a method and a system of the type in question, which constitutes a unique and original solution adapted to eliminate the drawbacks mentioned above.

To this end, it relates to a method characterized essentially in that it includes, in order to detect an individual in the observation zone, arranging a small number of similar infrared sensors focusing on the same area of observation, in which the field of vision is modulated and coded. To do this, for each of them, a combination of cells (lenses or mirrors), and thus beams, is masked. This combination is different for each sensor, in order to associate with each beam a unique code and to provide, to the computing unit, data to locate the individual position and movement.

This modulation, achieved by obturation of one or more cells, can be expressed in binary as follows: for each cell not obscured, we will say that the optical state is equal to 1 because the infra-red radiation is free to cross it and for each masked cell, we will say that its optical state is equal to 0.

The modulation of the field of vision of each sensor of m cells can be characterized by a vector having m components, these being equal to 0 or 1.

If we take the example of a sensor having 16 cells, the last 8 of which being masked, we get a modulation: M=(1, 1, 1, 1, 1, 1, 1, 1, 0, 0, 0, 0, 0, 0, 0, 0).

As a non-limiting example, with 4 sensors will be $2^4=16$ combinations available. They will therefore each be able to include 16 identifiable optical cells partially masked according to a fixed configuration.

In terms of detection, there will be 15 datums available because the beam having the optical vector 0 cannot distinguish from the signal 0. Therefore 11 detectors are saved, with an equivalent result.

The features and advantages of the invention will emerge more clearly from reading the detailed description which follows from at least one preferred implementation mode of the latter given by way of non-limiting example and shown in the attached drawings.

Figures 2, 3:
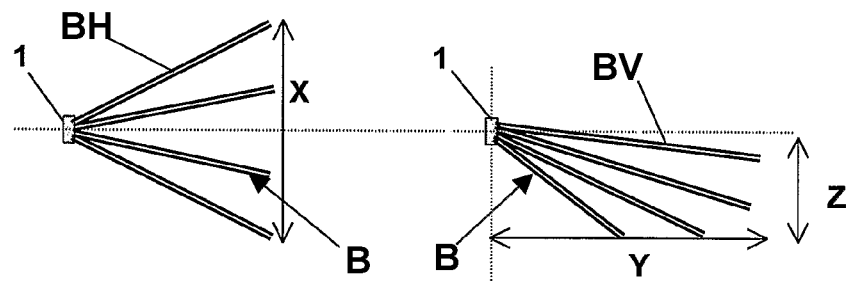
Figure 4:
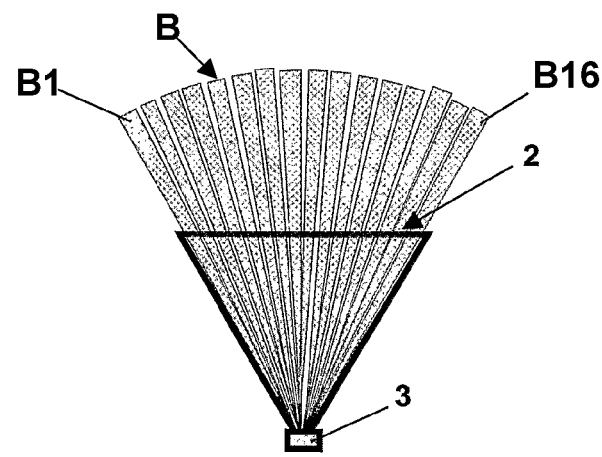
Figure 5:
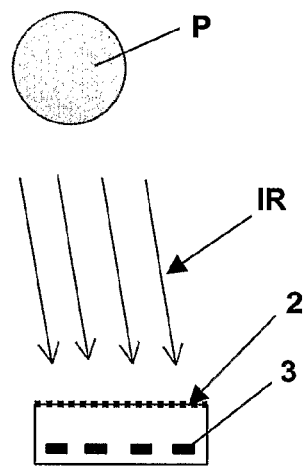
Figure 6:
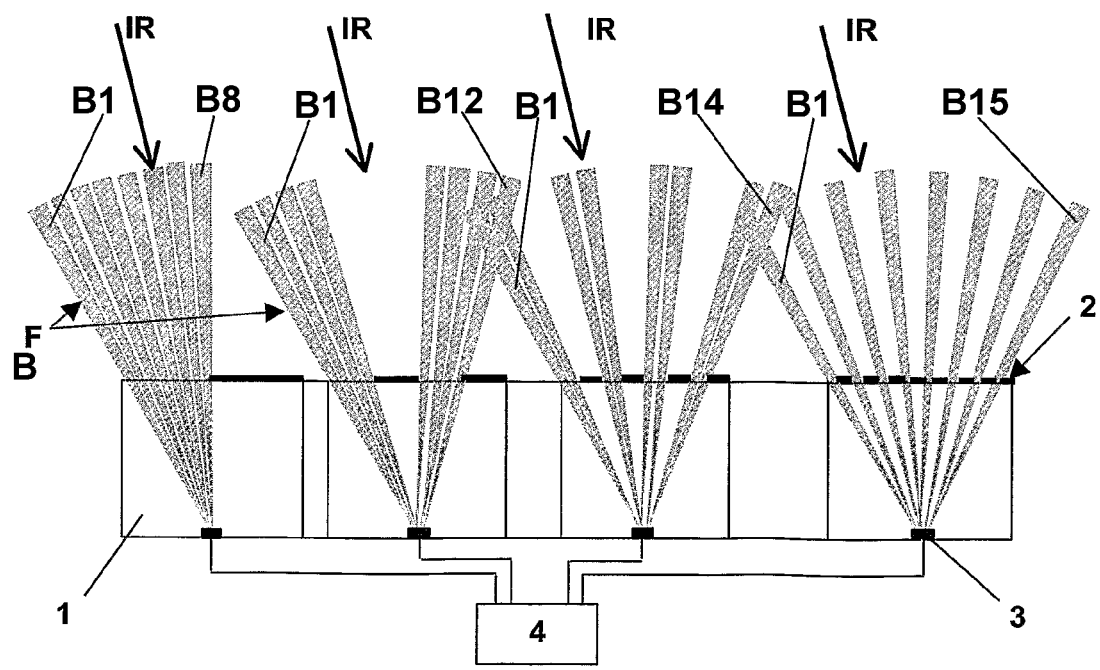
Figure 7:
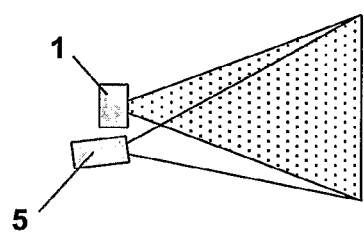
Figure 8:
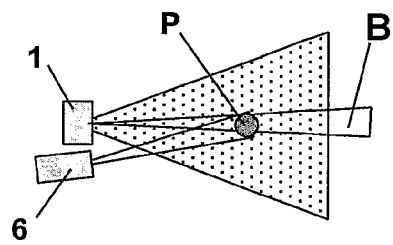

In these drawings:

FIG. 1 schematically shows a frontal view of an optical device, known per se, including 4×4 cells;

FIG. 2 schematically shows a top view of the optical device of FIG. 1, emphasizing the distribution of horizontal beams;

FIG. 3 schematically shows a profile view of the optical device of FIG. 1, emphasizing the vertical distribution of beams;

FIG. 4 schematically shows a top view of a detector, known per se, including a row of 16 coplanar cells;

FIGS. 5 and 6 schematically show a top view of an implementation example of a system for detecting and locating an intruder, according to the invention, employing 4 juxtaposed infrared detectors, each having a row of $2^4=16$ cells that are masked according to a different configuration for each sensor;

FIG. 7 schematically shows a top view of a sensor according to the invention coupled with a fixed camera focused on the same observation area;

FIG. 8 schematically shows a top view of a sensor according to the invention coupled with a mobile camera, equipped with a zoom, automatically driven to the area of infrared detection by the computing unit.

The system shown in the Figures is designed to detect an individual in a given observation zone (X, Y, Z) by means of N passive infrared sensors (1), each adapted to receive infrared energy emitted by an individual (P) traversing the aforementioned zone, each infrared sensor (1) being constituted by an optical device (2) focusing the received infrared (IR) energy onto a single pyro-electric component (3), each optical device (2) being constituted by a matrix of cells (2C), of the lens, mirror or other type, arranged in order to pick up a plurality of beams (B) according to a well-defined horizontal distribution (BH) and distribution vertical (BV), each pyro-electric component (3) being coupled to a computing unit (4) adapted to interpret the received data.

The method according to the invention, for detecting an individual (P) in the observation zone, comprises arranging a small number of similar N infrared sensors (1) focusing on the same observation zone, each provided with $2^N-1$ cells (2C), thus of beams (B), that are each masked according to a different combination in order to provide, to the computing unit, data to locate the individual in terms of position and movement.

According to variations of carrying out the invention, the method comprises:

slightly angularly shifting the cells (2C) of the various optical devices (2) in order to increase the accuracy of the localization of the individual and also the detection surface;

coupling, to the similar infrared sensors (1), focused on the same observation zone, a fixed camera (5), focused on the aforementioned zone, designed to confirm the position to dispel doubt and the movement of the individual by an analysis of the image in the image zone corresponding to the infrared detection zone;

coupling, to the similar infrared sensors (1) focused on the same observation zone, a mobile camera (6,) equipped with a zoom, automatically driven by the computing unit (4) on the infrared detection zone and designed to confirm the position of the individual and to track the individual's movements with the aid of an image precisely corresponding to the detection zone to have more visual details from the zone and to analyze the image to confirm or not confirm the infrared detection;

using optical devices (2), the masking of the cells (2C) of which being programmable.

The system, for the implementation of the method according to the invention, includes optical devices (2) chosen from a Fresnel lens of injected plastic, a set of juxtaposed mirrors or a liquid crystal screen including a matrix of programmable cells (2C).

The optical focus device is constituted by optical lenses specific and necessary to coverage zones of the N sensors and of which the surface of each lens is double in order to double the sensitivity.

It includes, at a broader level, sensors (1), at least a fixed camera (5) and/or at least a mobile camera (6) equipped with a zoom and a computing unit (4) interpreting the data received from the sensors and controlling the cameras.

The optical device shown in FIGS. 1 to 3 is equipped with 4 horizontal beams covering an angle of up to 90 degrees and 4 vertical beams covering an angle also up to 90 degrees.

The sensor shown in FIG. 4 is equipped with 16 coplanar beams.

The system according to the invention shown in FIGS. 5 and 6 has 4 sensors each equipped with 16 optical cells partially masked according to a well defined configuration in order to have $2^4=16$ combinations.

In terms of detection, 15 datums will be available because the beam having optical vector 0 cannot be distinguished from the 0 signal. Therefore 11 detectors are saved, with an equivalent result.

There will be thus be constructed a 4×4 matrix of sensors, the binary configuration of which will give the position of the individual in the observation zone.

The system according to the invention enables the analysis of movement and the estimation of the speed, the acceleration, the bearing, and the direction of movement.

It thus provides a removal of doubt about the merits of the alarm.

This is in keeping one of its major properties, which is ultra low power consumption. In fact, the movement analysis is conducted using very limited computing resources.

The sensor covered by the invention, coupled to a mobile camera, enables confirmation of the position of the individual and tracking the individual's movement, with the aid of an image precisely corresponding to the detection zone to have more visual details from the zone and to analyze the image to confirm or not confirm the infra-red detection.

The modulations according to FIGS. 5 and 6 are:
Detector No. 1: (1111111100000000)
Detector No. 2: (1111000011110000)
Detector No. 3: (1100110011001100)
Detector No. 4: (1010101010101010)

The set of these adjustments is what we call the matrix coding:

$$\begin{vmatrix} 1111111100000000 \\ 1111000011110000 \\ 1100110011001100 \\ 1010101010101010 \end{vmatrix}$$

Each vector column of this matrix gives the optical state of each beam. In the case of identification of the beams on a sensor according to the invention equipped with $2^2$ elements, the pyro-electric element Pn is at level 1 if it receives an infrared signal, that is to say that an intruder is in one of the observation beams, and it is at level 0 if it receives nothing, or if the intruder is in an obscured beam:

|  | P1 | P2 | P3 | P4 |
|---|---|---|---|---|
| Beam 1 | 1 | 1 | 1 | 1 |
| Beam 2 | 1 | 1 | 1 | 0 |
| Beam 3 | 1 | 1 | 0 | 1 |
| Beam 4 | 1 | 1 | 0 | 0 |
| Beam 5 | 1 | 0 | 1 | 1 |
| Beam 6 | 1 | 0 | 1 | 0 |
| Beam 7 | 1 | 0 | 0 | 1 |
| Beam 8 | 1 | 0 | 0 | 0 |
| Beam 9 | 0 | 1 | 1 | 1 |
| Beam 10 | 0 | 1 | 1 | 0 |
| Beam 11 | 0 | 1 | 0 | 1 |
| Beam 12 | 0 | 1 | 0 | 0 |
| Beam 13 | 0 | 0 | 1 | 1 |
| Beam 14 | 0 | 0 | 1 | 0 |
| Beam 15 | 0 | 0 | 0 | 1 |
| Beam 16 | 0 | 0 | 0 | 0 |

Beam 16 is not identifiable because it is identical to an absence of signal.

With a detector according to the invention, having only 4 elements, it is possible to identify 15 beams (B1 to B15).

More generally, with a detector according to the invention, having N elements arranged in a matrix or a column, it is possible to identify $(2^N-1)$ beams.

In the case of FIG. 6, the detection result is (1010), and the intruder is therefore in the field of beam No. 6.

Instead of being fixed in injected plastic, the set of the Fresnel lenses may be "displayed" on a liquid crystal screen. We obtain in this case programmable cells enabling variable segmentation of the field of vision of the pyro-electric component on the one hand as well as an adaptive optical coding on the other.

Obviously, the system according to the invention is independently applicable to optical devices having coplanar or spatial cells in 2 or 3 dimensions.

Of course, the invention is not limited to the implementation modes described and shown for which other alternatives can be provided, in particular:

the type of optical device and the number and arrangement of the active cells;

the number of optical devices used for a given observation zone;

the type and number of coupled fixed or mobile cameras, and the extension to other applications, without departing from the scope of the invention.

The invention claimed is:

1. A method for detection of a person in a given observation zone, by coding the visual field, the method comprising:

arranging N passive infrared sensors including each a single pyro-electric component and an optical device including a matrix of cells, of lens or mirror type, defining $2^N$ distinct beams according to a well-defined horizontal and vertical distribution and focusing the received infrared energy, which is emitted by a person traversing the observation zone, onto the single pyro-electric component, each matrix of $2^N$ cells being masked according to a different combination arranged in order to pick up corresponding beams of the observation zone, each pyro-electric component transmitting, to a calculation unit, $2^N-1$ binary data of N bits each in order to locate the person in terms of position and movement.

2. A method according to claim 1 further including slightly angularly shifting the cells of the various optical devices in order to increase the accuracy of the localization of the person.

3. A method according to claim 1 further including coupling a fixed camera, focused on the observation zone, to the calculation unit, in order to confirm the position and the movement of the person by an analysis of the image in the one of the cells of the observation zone.

4. A method according to claim 1 further including the step, performed by the calculation unit of, of driving a mobile camera to the one of the cells of the observation zone, in order to confirm the position of the person.

5. A method according to claim 1 further including using optical devices, the masking of the cells of which being programmable.

6. A system for the implementation of the method according to claim 1, characterized in the optical devices are chosen from a Fresnel lens of injected plastic, a set of juxtaposed mirrors or a liquid crystal screen including a matrix of programmable cells.

7. A system according to claim 6 characterized in that the optical focus device is constituted by optical lenses specific and necessary to coverage zones of the N sensors and of which the surface of each lens is double in order to double the sensitivity.

8. A system according to claim 6 characterized in that it includes sensors, a fixed camera and/or a mobile camera equipped with a zoom and a calculation unit interpreting the data received from the sensors and controlling the cameras.

9. A method for detection of a person, the method comprising:

arranging N passive infrared sensors each including an optical device, each optical device including a matrix of cells, of the lens or mirror type, arranged in order to pick up a plurality of beams according to a well-defined horizontal distribution and distribution vertical, the method further including the steps, performed by each infrared sensor, of:

receiving infrared energy of the person traversing an observation zone;

focusing the received infrared energy onto a single pyro-electric component, via the optical device; and sending data from the single pyro-electric component to a calculation unit, the optical devices having vertical beams covering an angle up to 90 degrees, the method further including the steps, performed in the calculation unit, of:

receiving the data sent by the infrared sensors;

processing the received data in order to locate the person to be in one of $2^N-1$ cells of the observation zone.

10. A method according to claim 9 further including the step, performed by the calculation unit of, of driving a mobile camera to the one of the cells of the observation zone, in order to confirm the position of the person.

* * * * *